United States Patent Office 3,582,351
Patented June 1, 1971

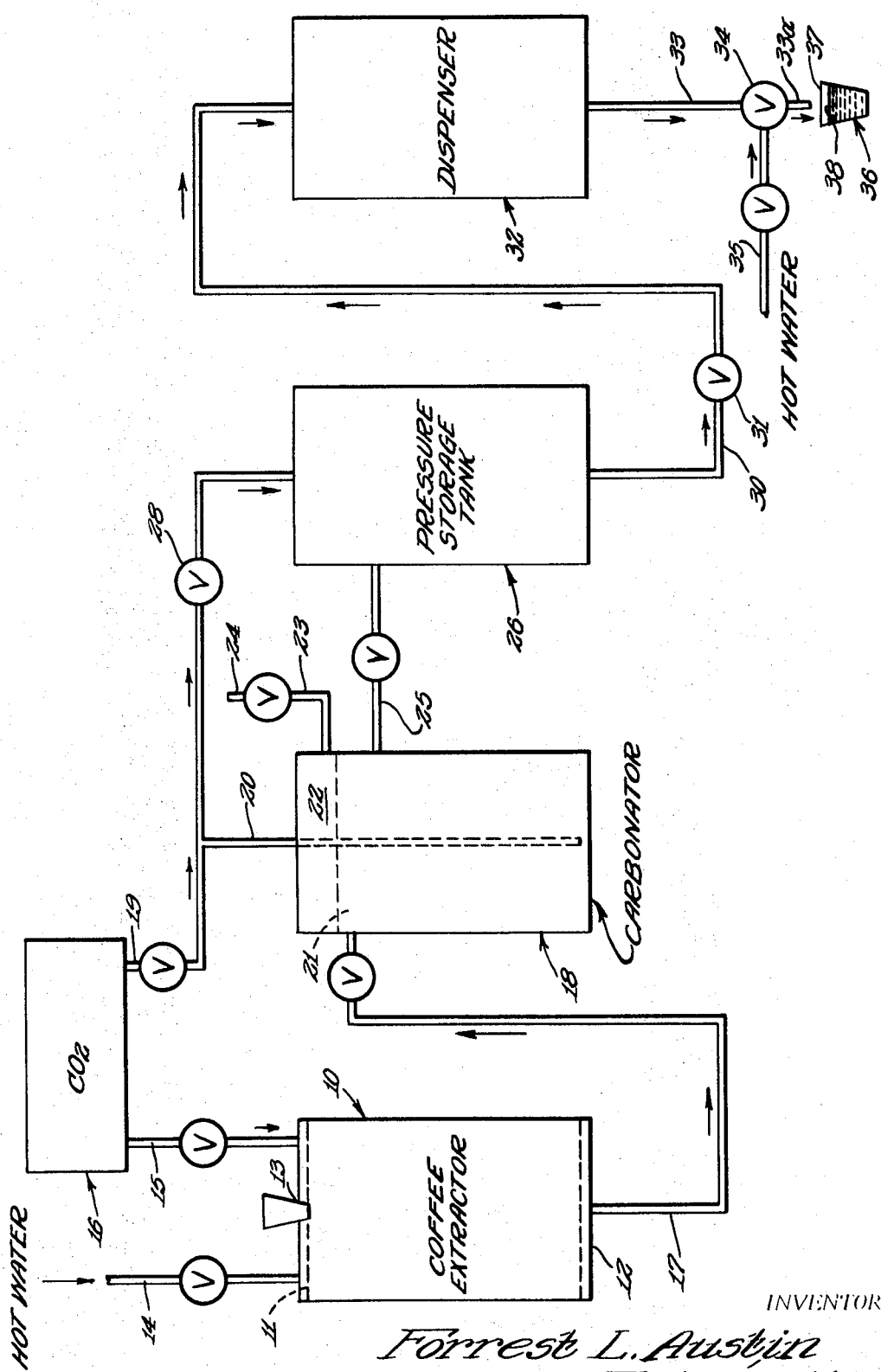

3,582,351
METHOD OF BREWING COFFEE
Forrest L. Austin, Brooklyn Center, and Richard T. Cornelius, Minneapolis, Minn., assignors to The Cornelius Company, Anoka, Minn.
Filed Mar. 20, 1968, Ser. No. 714,557
Int. Cl. A23f *1/08;* A23l *1/00*
U.S. Cl. 99—71                           2 Claims

ABSTRACT OF THE DISCLOSURE

A method of brewing coffee in accordance with which freshly ground coffee is infused with a predetermined amount of hot water in a coffee extractor maintained under pressure by inert gas, such as carbon dioxide, to provide a brew of "strong coffee" having a soluble solids content of from about 10 to 15% by weight, and therefore so strong as not to be palatable for drinking purposes. At the completion of the brewing step which requires only a few minutes time, the "strong coffee" liquid is expelled from the coffee extractor through the lower portion thereof by means of carbon dioxide gas so as not to cause any dilution, and is transferred into a pressurized carbonator vessel, held at ordinary or room temperatures, and maintained under gaseous pressure of carbon dioxide. Carbonation of the "strong coffee" liquid is effected in the carbonation vessel to an extent such that the liquid contains from 2 to 4 volumes of carbon dioxide for each unit volume of liquid. The carbonated "strong coffee" liquid is then transferred to a pressurized storage tank maintained under sufficient pressure of carbon dioxide gas to prevent substantial loss thereof from the liquid. From the pressure storage tank the carbonated "strong coffee" liquid is transferred as needed to a dispenser maintained under sufficient pressure to facilitate the discharge of the "strong coffee" through a mixing valve, in admixture with the proper amount of hot water to bring the "strong coffee" liquid to a suitable temperature and dilution for immediate consumption from a drinking cup into which the mixing valve discharges. Due to the relatively high concentration of the "strong coffee" a dilution of approximately one part of the "strong coffee" to ten parts of finished coffee beverage not only readies the liquid coffee for consumption but also effects a release of substantially all of the dissolved carbon dioxide gas from the liquid coffee so that the coffee in the drinking cup is substantially decarbonated, without, however, the formation of any objectionable amount of foam. The final coffee beverage as produced by our process, possesses the same taste and is of the same quality as that of freshly made coffee from the same coffee bean source, even though several weeks may have elapsed since the time of brewing the "strong coffee" liquid and the time of its consumption in diluted form as a beverage.

CROSS-REFERENCES TO RELATED APPLICATIONS

The present application constitutes an improvement over our prior applications, Ser. No. 465,896, filed June 22, 1965, now Pat. No. 3,349,691, and Ser. No. 488,070, filed Sept. 17, 1965, now U.S. Pat. No. 3,483,989. Reference is made to the patent of one of us, Cornelius Patent No. 3,261,507, issued July 19, 1966, in which carbon dioxide gas is used to carbonate a previously made fresh infusion of a coffee beverage. Our present invention constitutes an improvement over this patent and over our earlier filed applications, just referred to.

BRIEF SUMMARY OF THE INVENTION

This invention relates to an improved method for use in the commercial brewing of coffee on a relatively large scale and under such conditions that dispensing of the resulting coffee beverage to the consumer can take place days and even weeks after the coffee has been brewed, without impairment of its taste, flavor or quality. Our method comprises the steps of infusing dry, freshly-ground coffee with a predetermined amount of hot water sufficient to make a liquid "strong coffee" brew having a dissolved solids content of around 10 to 15%. The making of such a "strong coffee" brew is completed within a very few minutes if carried out in a coffee brewing apparatus such as disclosed and claimed in our pending application for patent Ser. No. 465,896.

The "strong coffee" brew is then discharged through a lower portion of the coffee extractor under gas pressure provided by carbon dioxide gas or other inert gas, thereby obviating any dilution of the "strong coffee" such as would take place if water were used in effecting the discharge of the liquid brew from the coffee extractor and its transfer to another vessel. In our method, the transfer is effected under carbon dioxide gas pressure into a carbonator, which may be of usual or conventional construction, and in which the "strong coffee" liquid is carbonated by the mixing therewith of carbon dioxide gas under pressure. The amount of carbonation is preferably such as to cause from two to four volumes of carbon dioxide gas to be dissolved in the liquid, since we have found that within this range the carbon dioxide functions satisfactorily to prevent any impairment in the quality of the "strong coffee." The amount of carbon dioxide used can be in a higher than 4 to 1 ratio v./v., but with resultant loss in economy. Carbonation is carried out at temperatures approximating that of the circumambient air, with the "strong coffee" liquid at whatever temperature it normally falls to after being transferred from the coffee extractor. Depending upon the temperature during carbonation, the liquid will absorb more or less carbon dioxide but within the approximate limits previously referred to.

In the next step, the carbonated "strong coffee" liquid is transferred, preferably under the pressure of the carbon dioxide gas in the carbonator to a pressure storage vessel, also maintained at circumambient air temperatures and under a sufficient pressure of carbon dioxide gas to maintain the level of carbonation and to effect a discharge of the liquid into a dispenser. From the dispenser, which is maintained under sufficient carbon dioxide gas pressure to prevent decarbonation and to facilitate the dispensing of the "strong coffee" liquid, the latter passes through a mixing valve, in which it is mixed with hot water in the proper proportions to give a coffee beverage of a conventional concentration and temperature for consumption. In general, if the "strong coffee" liquid is of a concentration of from about 10 to 15% by weight, 9 or 10 parts by volume of water at a temperature of between 180° and 212° F. are mixed with 1 volume of the "strong coffee" liquid that is delivered through the combined mixing and metering valve into a drinking cup.

Due to the relatively small volume of the "strong coffee" liquid in relation to the volume of hot water used in forming the ultimate coffee beverage, the former is substantially decarbonated in response to the mixing. As the volume of "strong coffee" being decarbonated is quite small, any foam in the drinking cup readily and shortly breaks up. The quick release of carbon dioxide from the discharge stream of coffee beverage is largely due to the fact that the carbon dioxide is less soluble in hot water than in cold, the escape from the liquid being aided by agitated handling and by release of the pressure on the liquid. Any carbonation that remains in the coffee beverage during the filling of the drinking cup escapes into the atmosphere without objectionable foaming.

It is therefore an object of this invention to provide a method of brewing coffee that can be carried out more economically than heretofore, largely because of the economies permitted by the use of a smaller volume of "strong coffee" that is first brewed, relative to the ten-fold volume of the coffee beverage that is dispensed and the accompanying lower costs involved in the equipment, in the amount of heat required and in the amount of carbon dioxide used for carbonation.

It is a further important object of the invention to provide a method of brewing coffee wherein a "strong coffee" brew is carbonated and maintained in an atmosphere of carbon dioxide up to the time that it is dispensed for consumption, at which time the carbonated "strong coffee" liquid is mixed with up to 9 or 10 parts v./v. of hot water which serves not only to dilute the "strong coffee" liquid to make it suitable for beverage purposes but also aids in decarbonating the carbonated coffee liquid during its dispensing into a drinking cup, thereby eliminating any separate decarbonating step and providing a dispensed coffee beverage substantially free from carbonation.

It is a further important object of this invention to provide a method of brewing coffee whereby even though the initial brew of "strong coffee" liquid may have been kept for days and even weeks before being dispensed, the maintenance of the "strong coffee" liquid in a carbonated state and under an atmosphere of carbon dioxide insures an ultimate coffee beverage having substantially the same taste, flavor and other qualities as a coffee beverage made from the same coffee beans and freshly brewed before consumption.

Other and further important objects of this invention will become apparent from the following description and appended claims.

BRIEF DESCRIPTION OF THE DRAWINGS

The drawing is a schematic illustration of the method of brewing coffee of our invention and is in the nature of a flow sheet with legends to indicate the equipment used in our process.

DETAILED DESCRIPTION OF INVENTION

With reference to the drawing, the reference numeral 10 indicates schematically a coffee extractor that is preferably of the construction described and claimed in our pending application Ser. No. 465,896. The coffee extractor 10 is provided near its top with a screen mesh 11 and near its bottom with a screen mesh 12 for confining the coffee grounds, the upper screen 11 having a central hopper-receiving opening 13 for passage of ground coffee into the extractor. Preferably, roasted coffee beans are freshly ground immediately ahead of their introduction into the extractor. After a measured amount of ground coffee has been charged into the extractor, sufficient to substantially fill the extractor, hot water is introduced through a valve controlled line 14 at a suitable temperature of between 180° and 212° F. and in an amount sufficient to form a "strong coffee" liquid of between about 10 and 15% dissolved solids content at the completion of the infusion.

The time required for the brewing of the "strong coffee" liquid in the extractor is a matter of minutes only, four minutes being generally sufficient. The "strong coffee" liquid is then expelled from the lower portion of the extractor 10 by application of an inert gas pressure, preferably carbon dioxide gas, introduced through a valve-controlled line 15 from a pressurized container 16 that provides a source of carbon dioxide gas under pressure for carrying out our method. By use of carbon dioxide gas to expel the "strong coffee" liquid, rather than using water to effect expulsion, there is no dilution of the "strong coffee" liquid in its discharge form the extractor through the line 17 that transfers the "strong coffee" liquid to a carbonator 18.

The carbonator 18 is of conventional construction and of sufficient size to receive the entire volume of "strong coffee" liquid transferred into it from the coffee extractor. Carbon dioxide gas is introduced from the pressure source 16 through a line 19 that includes a down-pipe 20 terminating near the bottom of the carbonator 18. The level of the "strong coffee" liquid within the carbonator is indicated by the dotted line 21 and is sufficiently below the top of the carbonator 18 to provide a blanket of carbon dioxide atmosphere in the space 22 thereabove. A pressure relief valve 23 provides for the release of any excess gas pressure from the carbonator 18 through the relief valve 23 for discharge into the atmosphere through a discharge line 24. In general, the amount of carbonation effected in the carbonator 18 is in the neghborhood of four volumes of carbon dioxide gas to one volume of "strong coffee" liquid, but for economical use of the carbon dioxide only that amount of carbon dioxide is used that is sufficient under the conditions of time and temperature during the retention of the carbonated "strong coffee" liquid within the carbonator, to insure non-impairment of the quality of the coffee up to the time of the dispensing thereof for consumption.

From the carbonator 18, the carbonated "strong coffee" liquid is transferred through a line 25 to a pressure storage tank 26. Said storage tank 26 is kept under carbon dioxide gas pressure at a pressure that is reduced from that in the carbonator 18 but is still sufficient to facilitate the transfer of the contents of the storage tank for dispensing purposes. A line 27, which may connect through the line 19 to a pressurized $CO_2$ source 16 serves to deliver carbon dioxide gas under pressure through a control valve 28 into the top of the pressure storage tank 26.

From the pressure storage tank 26, the carbonated "strong coffee" liquid is conducted through a line 30 provided with a control valve 31, to a dispensing vessel, termed "dispenser" and identified by the reference numeral 32. The dispenser 32 is preferably a sealed vessel that maintains the carbonated "strong coffee" liquid in a carbonated state and at a pressure sufficient to facilitate the dispensing of the carbonated liquid through a discharge line 33. The dispenser 32 may be of conventional construction but is unjacketed so as to be subject to the normal surrounding temperatures.

From the dispenser 32, the carbonated "strong coffee" liquid is discharged through the line 33 into a mixing and metering valve 34. At the same time, hot water is introduced into the mixing valve 34 through a valve-controlled line 35, and by proper setting of the metering mixing valve 34 is mixed with carbonated "strong coffee" liquid in such proportion as to give a mixture that upon discharge from the metering valve 34 into an extension 33a of the line 33, is of suitable or conventional concentration for consumption as a coffee beverage. The hot water introduced through the line 35 is a temperature, such as from 180° to 212° F., imparts to the coffee beverage upon discharge from the mixing valve 34 a temperature suitable for immediate consumption of the coffee beverage.

From the mixing valve 34, the coffee beverage is delivered through the extension line 33a into a drinking cup 36. As is customary in the case of a coffee dispenser, a coin-controlled dispensing mechanism may be associated with the coffee dispenser to insure the dispensing of an exact volume of the beverage into the cup 36. As the stream of coffee, represented by the dotted line 37, falls into the cup 36 and during the filling of the cup to a level such as indicated by the reference numeral 38, the carbon dioxide escapes from the carbonated liquid coffee into the atmosphere. Due to the raising of the temperature of the liquid and to the exposure to the atmosphere of the liquid while in the form of a stream 37, the release of the carbon dioxide gas from the liquid is relatively rapid and sufficiently so as to result in the formation of little, if any, foam in the cup 36. What foaming does take place is quickly dissipated as the cup fills up with the coffee beverage.

Thus, one of the advantages of our method is that it eliminates the need for using a decarbonating step, as a separate step in the making of the coffee beverage. In our method, the decarbonation of the carbonated liquid occurs naturally and as an inherent concomitant to the operation of our method. By reason of the relatively small volume of the carbonated "strong coffee" liquid as compared with the relatively large volume of hot water mixed therewith at the metering and mixing valve 34, it is not necessary that the carbonated "strong coffee" liquid be at an elevated temperature prior to mixing; the larger volume of hot water at from 180° to 212° F. is sufficient to bring the admixture to the desired temperature for drinking purposes.

As previously stated, where the original "strong coffee" brew has a dissolved solids content from 10 to 15% by weight, the dilution at the mixing valve with from 9 to 10 volumes of hot water for each volume of the "strong coffee" liquid results in a dissolved solids content in the final coffee beverage of from about 0.75% to 1.25% of dissolved solids, and usually from about 0.75% to 0.9% dissolved solids in the beverage delivered to the cup 36. To prepare the "strong coffee" brew, approximately one pound of freshly ground coffee is used for each quart of the water introduced into the extractor. The resulting "strong coffee" brew is, of course, so strong as to be unpalatable, but upon dilution with from 9 to 10 volumes of hot water, a coffee beverage is obtained that is of the same taste, palatability and quality as a freshly brewed coffee, and that is free from any objectionable carbonation.

It will be understood that modifications and variations may be effected without departing from the scope of the novel concepts of the present invention.

We claim:

1. A method for making a coffee beverage from dry ground coffee and water, comprising
    introducing into a pressurizable chamber of predetermined size dry ground coffee;
    adding to said chamber a predetermined volume of hot water to extract said ground coffee for a period of time sufficient to produce an infusion of a strong coffee liquid containing between about 10 and 15% by weight of dissolved solids;
    carbonating said strong coffee liquid under substantially circumambient air temperatures to incorporate therein at least two carbon dioxide gas to one liquid v./v.;
    adding an amount of hot water directly to said carbonated coffee liquid just prior to discharge thereof into an open drinking receptacle to dilute said liquid to a predetermined dissolved solids concentration;
    said strong coffee liquid not being substantially heated after being produced until said hot water is added just prior to discharge thereof; and
    subsequent to said discharge exposing said liquid to the circumambient atmosphere to substantially decarbonate said liquid.

2. A method as defined by claim 1, wherein said carbonation causes the dissolution of from 2 to 1, to from 4 to 1 of carbon dioxide gas/strong coffee liquid v./v., and
    said infusion of strong coffee liquid is transferred without water dilution thereof under carbon dioxide gas pressure from the locus of extraction to the locus of carbonation.

References Cited

UNITED STATES PATENTS

| | | | |
|---|---|---|---|
| 2,413,687 | 1/1947 | Bogoslowsky | 99—71 |
| 2,949,993 | 8/1960 | Adler | 99—71UX |
| 3,119,695 | 1/1964 | Kahan | 99—79 |
| 3,261,507 | 7/1966 | Cornelius | 99—65X |
| 3,349,691 | 10/1967 | Austin | 99—289 |

FOREIGN PATENTS

| | | | |
|---|---|---|---|
| 361 | 1/1880 | Great Britain | 99—71 |

FRANK W. LUTTER, Primary Examiner

R. HALPER, Assistant Examiner

U.S. Cl. X.R.

99—79